Feb. 24, 1970   R. SCHAYES ET AL   3,497,671
ARRANGEMENTS FOR HEATING THE RADIATION-SENSITIVE MATERIAL
OF THERMOLUMINESCENT DOSIMETERS
Filed Sept. 20, 1966   2 Sheets-Sheet 1

INVENTORS
RAYMOND SCHAYES
ROGER GOURLET
BY
AGENT

# United States Patent Office 3,497,671
Patented Feb. 24, 1970

3,497,671
ARRANGEMENTS FOR HEATING THE RADIATION-SENSITIVE MATERIAL OF THERMOLUMINESCENT DOSIMETERS
Raymond Schayes, Brussels, and Roger Gourlet, Vorst, Belgium, assignors to Manufacture Belge de Lampes et de Materiel Electronique en abrege, M.B.L.E., Brussels, Belgium
Filed Sept. 20, 1966, Ser. No. 580,792
Claims priority, application Belgium, Sept. 21, 1965, 18,141
Int. Cl. H05b 1/00, 1/02, 3/00
U.S. Cl. 219—209                               8 Claims

ABSTRACT OF THE DISCLOSURE

An electric heating apparatus for the heater filament of a thermoluminescent dosimeter comprises a current sensing element and a switching transistor connected in series with the heaer filament across a voltage source. The current sensing element provides an electric signal that is a function of the effective value of the heater current. This signal controls a pulse generator that supplies control pulses to the control electrode of the transistor. The width of the control pulses are a function of the heater current and control the "on-off" time of the transistor to maintain the heater current constant.

---

Figure 1:
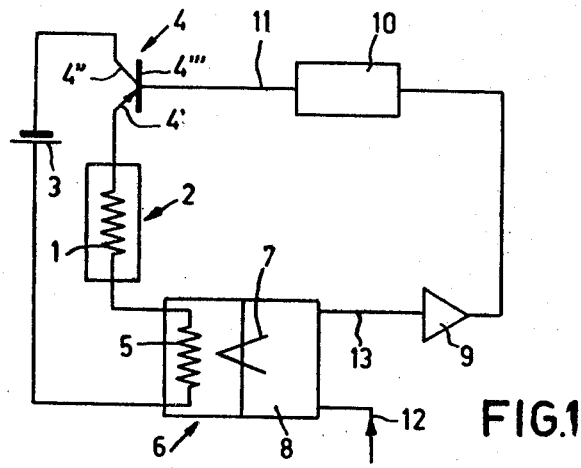

This invention relates to thermoluminescent dosimeters, and more particularly to apparatus for controlling the heater current to the heater element of the thermoluminescent material.

It is known to measure the amount of radiation supplied to a thermoluminescent dosimeter by heating the thermoluminescent material, and it has been found that during a variation of the temperature between a minimum and a maximum value, light is emitted with a radiation-dependent intensity in a few not very large temperature ranges. The amount of light emitted in each temperature range may be measured, but the maximum intensity of the emitted light also provides an indication of radiation energy stored. The latter measurement when carried out by means of successive dosimeters provides comparable results only if the rise in temperature proceeds correspondingly. It is known that a variation in the temperature gradient causes the intensity of the emitted light to vary.

It is common practice to heat the thermoluminescent material by means of an electrically heated filament which transfers the heat to the said material by conduction of radiation. For thermal luminescent dosimeters irradiated with equal radiation doses to provide the same measuring results, it must be ensured that the increase in temperature as a function of time always has the same variation on heating of the filament. It has proved possible to avoid comparatively significant differences in the temperature variation by regulating the supply of electric energy to the filament in a manner that between a minimum and a maximum value the filament temperature increases in proportion to time.

The present invention relates to an arrangement for heating, with a constant temperature increase, a heater filament for a thermoluminescent dosimeter employed in a measuring instrument of the type which measures the light-radiation emitted by the thermoluminescent material upon an increase of the temperature. According to the invention, the circuit connecting the heater filament to a voltage supply includes current regulating means for maintaining constant the strength of the heating current of the filament during the rise of the temperature from a minimum value to a maximum value. The current regulating means comprises a control member for repeatedly breaking the heater current, control means being provided for controlling the sequence of current breaks under the influence of the effective strength of the heater current.

In a preferred embodiment of the invention, the regulating means is a switching transistor which is connected in series with the supply source, with the heater filament and with a member for measuring the effective value of the current. The transistor passes or blocks the supply current in accordance with the presence or absence of a pulse at its control electrode. The pulse is produced by a pulse train generator which supplies pulses the duration of which is a function of the measured effective value of the current.

Figure 2:
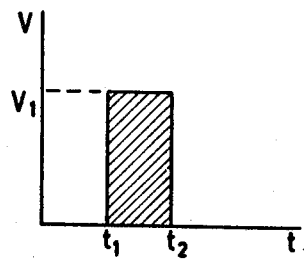
Figure 3:
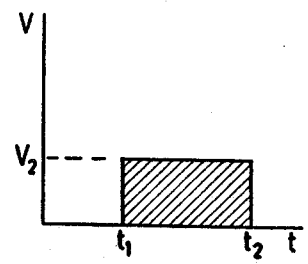
Figure 5:
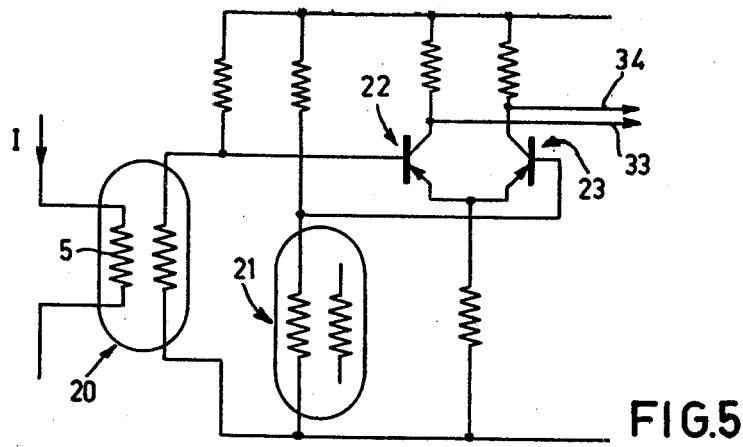
Figure 4:
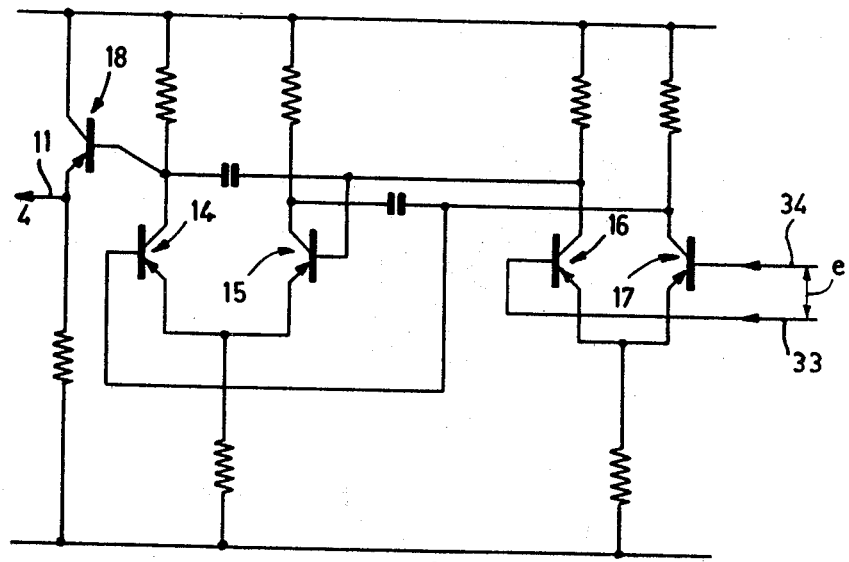
Figure 6:
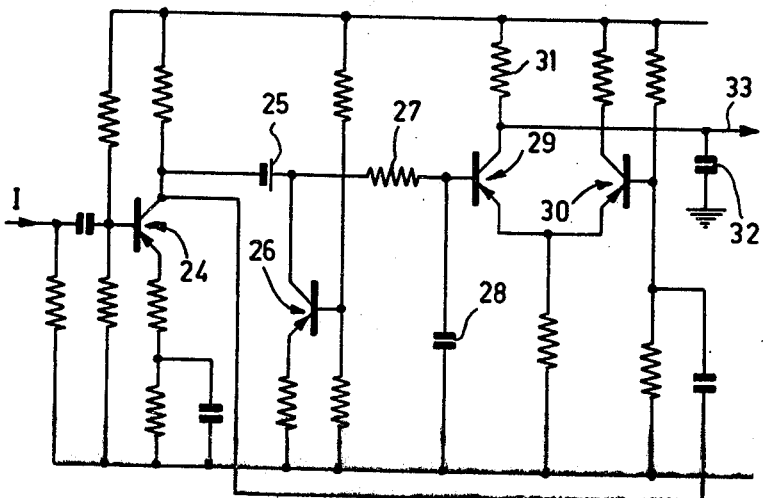

In order that the invention may readily be carried into effect, an embodiment thereof will now be described, by way of example, with reference to the accompanying diagrammatic drawing, in which:

FIGURE 1 is a schematic circuit diagram of the basic elements of the arrangement according to the invention, FIGURES 2 and 3 show the form of the voltage pulses produced, FIGURE 4 shows a preferred embodiment of the pulse train generator, and FIGURES 5 and 6 each show an embodiment of the measuring instrument.

The circuit diagram shown in FIGURE 1 comprises a supply circuit and a control circuit which operates by feedback. The supply circuit comprises, in series, the heater filament 1 of a thermoluminescent dosimeter (which is not shown in detail since the dosimeter does not form part of the invention), a supply source 3, a power transistor 4, which is connected in the circuit through the emitter 4' and the collector 4", and a sensing element 5 for a detector 6 for detecting the effective value of the current flowing through the heater filament 1. In the present case, the element 5 is the heater filament of a temperature dependent resistor shown schematically by reference numeral 7. Transistor 4 and heater filament 5 comprise the current regulating means for the dosimeter heater filament 1.

To the detector 6 is connected a control circuit comprising a comparison circuit 8, an amplifier 9 and a pulse train generator 10. The output 11 is connected to the base 4''' of the transistor 4. The latter control circuit constitutes the means for controlling the operating sequence of transistor 4 as a function of the heater current.

An input lead 12 symbolizes a reference value for the comparison circuit 8, the output of which is represented by the conductive connection 13 to the amplifier 9.

The operation of the circuit arrangement is based on the production of a voltage the magnitude of which is determined, by means of the elements 5 and 7, by the effective value of the heater current. This value is compared in the circuit 8 with a reference value which is symbolically represented by the input lead 12. The resulting error signal e is amplified in the amplifier 9, which supplies a control voltage to the pulse train generator 10. The generator 10 applies its output pulses to the base 4''' of the transistor 4, which acts as an on-off switch.

The amplitude of all the pulses produced by the pulse train generator 10 is constant, but the duration depends upon the amplitude of the signal applied to the generator. This duration is arranged to be a function of the supply voltage so that, when a lower voltage causes the current pulses to have a smaller energy content, the duration of these pulses is proportionally prolonged so that the energy passed in each pulse remains constant.

A consideration of the diagram which represents the voltage V across the filament 5 as a function of time shows that when a voltage $V_1$ renders the transistor 4 completely conductive, this voltage has a duration $(t_2-t_1)$. When the voltage $V_1$ is lower, the duration of the pulse which renders the transistor 4 conductive, i.e. the time during which current flows through the filament 5, will belonger so that $(t_2-t_1)$ $V^2$ remains constant. Thus, the time during which current flows through the heater filament is increased as the supply voltage is decreased.

The pulse train generator 10 comprises a multivibrator which, in known manner, includes two transistors 14 and 15 in common emitter arrangement. The multivibrator is preceded by a differential amplifier including the transistors 16 and 17. The continuous error signal $e$ (the voltage between the input leads 33 and 34) is applied between the bases of these two transistors. The differential amplifier serves to determine the relaxation periods of the multivibrator as a function of the error signal. When one transistor is conductive, the other is blocked, and the duration of each of these conditions depends upon the corresponding relaxation period. There appear at the collector of the transistor 14 squarewave pulses of variable duration, which are applied by an output transistor 18 to the base of the power transistor 4 so that the transistor 4 operates as an on-off switch in the above-mentioned manner.

FIGURE 5 shows an embodiment of a detector 6 the operation of which is controlled by the effective value of the heater current. This current flows through the heater filament 5 and the heat produced therein influences a temperature-dependent resistor 20. This resistor is connected in a Wheatstone bridge together with a temperature-dependent resistor 21. The resistor 21 serves as a reference and in addition permits the provision of temperature compensation. The output voltage of the bridge is applied to a differentiating circuit including two transistors 22 and 23, the error signal $e$ appearing at the output 33-34. The error signal is applied to the pulse train generator 10 through the amplifier 9.

FIGURE 6 shows an alternative embodiment of the detector 6 in which the circuit is less sensitive to the ambient temperature than in the embodiment shown in FIGURE 5. Since the current I through the heater filament is pulsatory, it can be amplified in an alternating-current amplifier 24. At the output of the amplifier 24 the pulses are differentiated by a capacitor 25.

In general, such a differential pulse has a wave form having an abrupt descending edge the height of which is proportional to I and a succeeding comparatively slowly ascending exponential edge. Since, however, the charging current of the capacitor 25 is maintained constant by means of a transistor 26, this ascending edge is no longer exponential but linear, the slope being constant. Hence, these differentiated pulses will be triangular and have an area proportional to $I^2$.

They are integrated in a capacitor 28, which consequently provides the mean value of $I^2$. A proportional value is set up across a resistor 31, however, only for the time that the current I flows through the heater filament. During the remainder of the time the transistor 30 is completely conductive so that the transistor 29 is blocked. This is due to the presence of the emitter resistor common to both transistors. As a result, capacitor 32 is charged with the mean value of $I^2T$, where T is the duration of the pulse I. Thus, at the output 33 a voltage appears which is proportional to the effective value of the heater current flowing through the filament. This output 33 is connected to one of the input leads shown in FIGURE 4, the reference voltage being applied to the other input lead 34.

What is claimed is:

1. An electric heating apparatus for the heater filament of a thermoluminescent dosimeter employed in a measuring instrument which measures the light-radiation emitted by the dosimeter thermoluminescent material upon an increase of the temperature, said apparatus comprising a source of supply voltage, circuit means connecting the heater filament to said voltage supply, said circuit means including current regulating means for maintaining constant the effective value of the heater current during the temperature rise of the heater element from a minimum value to a maximum value, said regulating means comprising a control member for repeatedly interrupting the flow of heater current, and control means responsive to the heater current for controlling the control member operating sequence as a function of the effective value of the heater current.

2. Apparatus as claimed in claim 1 wherein said control member comprises a switching transistor having a control electrode and said control means comprises, a pulse generator having an output connected to said control electrode, and means for supplying a voltage to the pulse generator input which depends upon the effective value of the heater current, said pulse generator producing constant amplitude pulses having a time duration which is a function of the effective value of the heater current.

3. Apparatus as claimed in claim 1 wherein said circuit means includes a thermionic filament through which said heater current flows, a temperature-dependent resistor thermally coupled with said thermal filament and connected in one leg of a bridge circuit, said bridge circuit including in a second leg a second temperature-dependent resistor which is thermally coupled to a second thermal filament connected in a reference circuit, and said control means comprises, a pulse generator having an output coupled to control said control member, a difference amplifier, and means for applying the output voltage of the bridge circuit through said difference amplifier to the input of said pulse generator.

4. A circuit as claimed in claim 1 wherein said control means comprises, means for producing a voltage pulse which is proportional to the effective value of the heater current, means for coupling said voltage pulse to a differentiating circuit, and means for coupling the output of said differentiating circuit to an amplifier which includes an integrating circuit which at its output delivers the mean value of the amplified voltage.

5. A temperature control system for the heater filament of a thermoluminescent dosimeter comprising, a source of voltage, current control means having a control electrode for controlling the current flow therein, current sensing means, means directly connecting said current sensing means, said heater filament, and said current control means in series circuit across said voltage source, said current sensing means producing an electric signal that is determined by the effective value of the heater current, means for coupling said signal to the input of a pulse generator to control the voltage pulses generated therein in a given manner, and means for applying said voltage pulses to said control electrode so that said current control means sequentially interrupts the flow of heater current as a function of the effective value thereof.

6. A system as claimed in claim 5 wherein said current sensing means comprises, a heater element in series with said heater filament and said current control means, and a temperature dependent element thermally coupled to said element.

7. A system as claimed in claim 6 further comprising a second temperature dependent resistor arranged to provide temperature compensation, and means connecting said first and second temperature dependent resistors in separate legs of a Wheatstone bridge circuit, said signal being derived across the output terminals of the bridge circuit.

8. A system as claimed in claim 5 wherein said signal coupling means includes an amplifier for supplying a signal to said pulse generator whose amplitude is determined by the effective value of the heater current, said pulse generator producing voltage pulses that vary in width as a function of the a signal amplitude.

References Cited
UNITED STATES PATENTS

| | | | |
|---|---|---|---|
| 3,102,689 | 9/1963 | Ditto | 219—501 X |
| 3,107,285 | 10/1963 | Knapp | 219—501 X |
| 3,283,150 | 11/1966 | Schayes | 250—71 |
| 3,376,416 | 4/1968 | Rutland et al. | 259—71 X |

JOSEPH V. TRUHE, Primary Examiner

C. L. ALBRITTON, Assistant Examiner

U.S. Cl. X.R.

219—501; 250—71.5